Oct. 14, 1969  R. E. HULTEN  3,472,541
MINIMUM LASH, ANTI-RATTLE CONNECTION
Filed Sept. 22, 1967
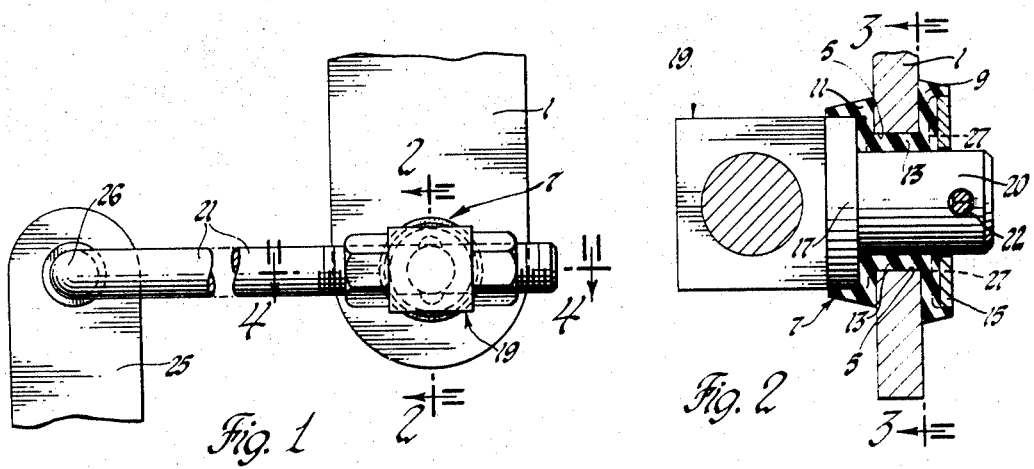
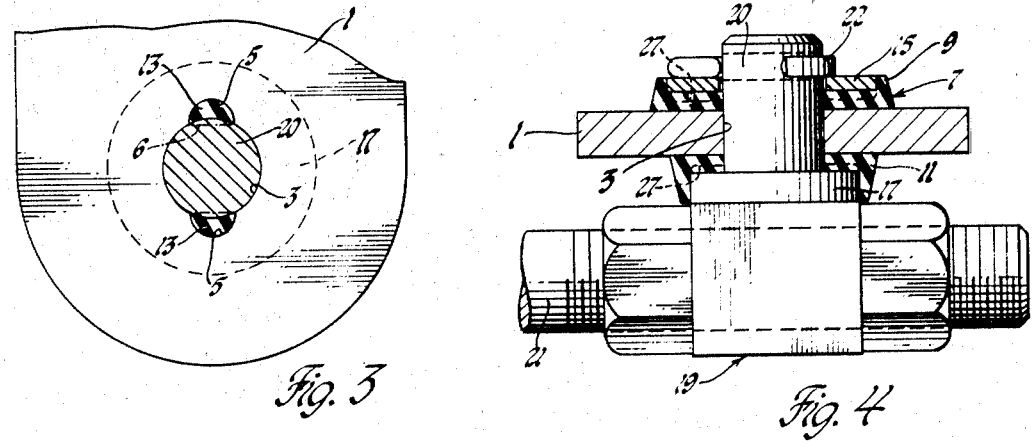
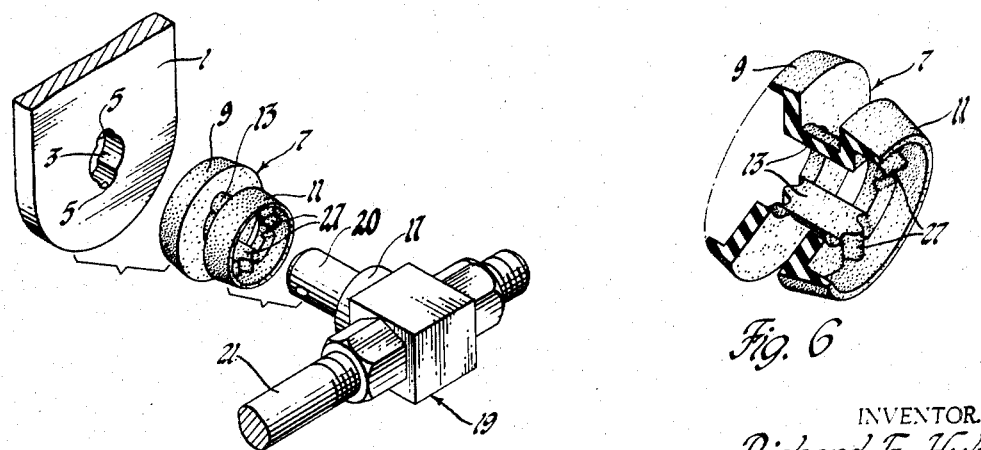
INVENTOR.
Richard E. Hulten
BY
Charles R. White
ATTORNEY ated Oct. 14, 1969

United States Patent Office 3,472,541
Patented Oct. 14, 1969

3,472,541
MINIMUM LASH, ANTI-RATTLE CONNECTION
Richard E. Hulten, Rochester, Mich., assignor to General Motors Corporation, Detroit, Mich., a corporation of Delaware
Filed Sept. 22, 1967, Ser. No. 669,843
Int. Cl. F16c *11/00;* F16l *5/00*
U.S. Cl. 287—93                                    7 Claims

ABSTRACT OF THE DISCLOSURE

An articulated linkage system including an operating lever pivotally connected to a force-transmitting control rod which, in turn, is pivotally connected to an actuating lever. The pivot connection between the operating lever and control rod is formed with minimum lash fit between a pivot carried by the control rod and the operating lever so that force applied to the operating lever will be transmitted to the control rod with minimum lost motion. The operating lever has an elastomeric grommet for the opening, with spaced sealing lips for the pivot connection, joined by spaced and opposing connector portions that extend through the pivot opening in the control rod to provide a yieldable interference fit between the pivot connecting the control rod and operating lever to absorb vibration and reduce rattle between the rod and the lever.

---

This invention relates to a minimum-lash, anti-rattle connections between members and, more particularly, to a pivot connection between first and second levers to reduce lost motion when an operating force is applied to the first lever to actuate the second lever. Further, there is a yieldable interference fit between the first lever and the pivot in a direction generally transverse to the minimum lash fit to yildably hold the pivot in the lever to reduce vibrations and prevent rattle between the levers.

In this invention, a special elastomeric gommet, molded to a first lever member, has spaced sides joined by opposing portions that extend through an opening formed in the lever and provide an elastic interference fit betwen the pivot pin carried by a second lever and the first lever to reduce vibration and rattle. The pivot pin and the first lever also have a close fit in the direction that force is being applied by the first lever to the second lever and generally transverse to the interference fit to provide for minimum lash upon movement of the first lever.

An object of this invention is to provide an advanced minimum lash, anti-rattle connection between two levers or other connecting elements.

Another object of this invention is to provide a pivot connection between a force-applying operator member and a force-transmitting member in which there is a close or minimum lash fit in the connection in the direction that apply force is being transmitted and a yieldable vibration-damping connection in a direction generally transverse to the direction of transmitted apply force.

These and other objects of this invention will become more apparent from the following detailed description and drawings in which:

FIGURE 1 is a side view of a portion of a transmission operating linkage.

FIGURE 2 is a view partially in section taken generally along the lines 2—2 of FIGURE 1.

FIGURE 3 is a side view of one of the linkage members.

FIGURE 4 is a view partially in section taken generally along the lines 4—4 of FIGURE 1.

FIGURE 5 is an exploded perspective view of a portion of the FIGURE 1 linkage.

FIGURE 6 is a perspective view of a grommet utilized to provide an interference fit between lever members.

In FIGURE 1, lever 1 is operated by a transmission control lever such as that shown by the United States Patents 2,922,315 to Primeau issued Jan. 26, 1960, and 3,264,894 to Popovich et al. issued Aug. 9, 1966. Lever 1 is preferably a metallic member which is formed at one end with an aperture or opening 3 elongated by generally semi-circular and opposing cavitations 5. The shape of the aperture is best shown in FIGURES 3 and 5. A grommet 7 made of a suitable elastomer, preferably of a rubber compound, which has a high internal friction and is highly resistant to abrasion and which can be bonded to the metal used for lever 1, is molded onto the lever as shown in FIGURES 2 and 4. The preferred rubber compound is oil resistant so grease can be applied to the pivot connection described below. The grommet is formed with annular spaced sides 9 and 11, each having a central opening which is axially aligned with the opening 3. The grommet sides are connected by spaced ribs or intermediate portions 13 that extend through the cavitations 5. The sides are preferably annular and terminate in an annular projecting wall which forms recesses to accommodate a washer 15 and annular head portion 17 of a metal swivel 19 as best shown in FIGURES 2 and 4.

The intermediate portions of the grommet extend through the cavitations 5 and in a relaxed position the flat surface for contacting the pin contains the chords 6 for the circular portion of aperture 3 so that there will be an interference fit between the cylindrical metallic pivot pin 20 of swivel 19 when positioned in the opening 3. FIGURE 3 illustrates this interference fit where it will be noted that the flat surface of the elastic material of the intermediate portions of the grommet has been displaced by the pin from the dotted chordal position to conform with the curved surface of the pivot pin 20. This interference fit provides a centering action to position the pin in the center of the aperture with the clearance between the pin and aperture substantially evenly distributed to hold the pin out of contact with the metal inner diameter surface of the aperture. The relaxed flat surface could be concave if less interference is desired or convex if more interference is desired, but it has been found that the flat surface provides a preferred arrangement in automotive linkages such as those of the two above-identified patents. The aperture 3 is formed so that the pivot pin 20 and the lever 1 have a close or small lash metal-to-metal fit with opposing curved wall portions of the opening 3 between the cavitations closely adjacent to opposing curved surfaces of pivot pin 20. The swivel is connected to lever 1 pivot pin 20, washer 15 and cotter pin 22. As shown by FIGURES 3, 4 and 5, the swivel threadedly received one end of control rod 21 which is angularly disposed with respect to lever 1. The other end of rod 21 is pivotally connected to one end of a lever member 25 by pivot 26. Lever member 25 may be connected through a shifter shaft and a shifter form lever to a shifter fork or other member utilized to operate a change-speed transmission as shown in the above-identified patent to Popovich et al.

As employed in a gear shift control linkage, lever 1 may be the first-second shift lever which is selectively connected to a driver controlled gear shift lever as described in the above-identified patent to Primeau. When the gear shift lever is displaced to select either first or second gear, lever 1 is turned in a direction appropriate to the ratio being selected to displace the control rod 21 longitudinally. This turns lever 25 to actuate the first-second shifter form to condition the transmission for the selected ratio.

It will be noted that the operating force applied to lever 1 and transmitted to rod 21 is coaxial with the control rod 21 and, accordingly, the minimum or small lash fit between the lever 1 and the pivot pin 20 provides for force transmittal with small lost motion between these two elements when the control linkage is actuated. The elastic interference fit between the pivot and the lever is coaxial with the axis of lever 1 and yieldably holds the pivot pin centered in the aperture in lever 1 to reduce any tendency to rattle and dampen vibrations of the rod 21 and the connected lever 1. Thus the interference fit applies a centering force to the pin primarily transversely or perpendicularly as shown in the drawing to the line of action of the applied force which is along the axis of rod 21 and also positions and tends to center the pin in the aperture along the line of applied force. When a force is applied to rod 21, the intermediate portions of the grommet yield to permit movement permitted by the small clearance to establish metal-to-metal contact between the pin and wall of the aperture for force transmittal.

The elastomeric grommet as molded onto the control lever has other features since the sides 9 and 11 provide sealing lips to bar the entrance of dirt, dust and water into the pivot joint and to retain lubricant therein. FIGURES 2 and 4 best illustrate the annular sealing contact between the sides 9 and 11 and pin 20. The yieldable ribs 27 formed on the sides of the grommet absorb the assembly tolerances of the swivel, washer, and pin attachments. This precludes the requirement of a spring washer or other type of spring retainers usually used to absorb the fit-up tolerances in a conventional arrangement.

Although applicant has described one preferred embodiment providing positive control of rattle due to vibration between linkage members and reduced lash between members, it will be understood that other modifications and variations of this invention may now be readily made. Accordingly, this invention is not to be limited by that which is particularly shown and described but only by the claims which follow.

I claim:

1. In an articulated linkage system, a rotatable operator link, a longitudinally movable force-transmitting link disposed at an angle with respect to said operator link, connector means for pivotally connecting said links, said connector means comprising an aperture defined by wall means formed in one of said links and projection means carried by the other of said links which extends through said aperture, said projection means extending through said aperture and having a sliding fit with predetermined opposed portions of said wall means defining a part of said aperture so as to have a small lash fit therebetween so that said projection means and at least one of said opposed portions of said wall means physically contact each other in response to a predetermined force applied to one of said links so that said force is directly transmitted to the other of said links by said projection means with minimized lost motion, an elastomeric grommet means carried by one of said links and having spaced portions disposed longitudinally in said aperture and contacting said projection means and remaining predetermined opposed portions of said wall means defining said aperture to position said projection means in said aperture and to provide a yieldable interference fit for said projection means to dampen vibration and reduce rattle between said links.

2. The linkage system of claim 1 wherein said interference fit provided by said spaced portions is axially aligned with the longitudinal axis of said operator link, said small lash fit being disposed transverse to said interference fit to permit a turning force applied to said operator link to be transmitted to said force transmitting link through direct contact between said projection means and a portion of said wall means providing said small lash fit.

3. In a small-lash anti-rattle connection, first and second metallic link members, one of said link members having an opening therein defined by a wall, metallic pivot means extending from the other of said link members through said opening and having a sliding fit therewith so as to provide a small lash fit with diametrically opposing portions of the wall defining said opening for physically contacting at least one of said opposing portions of said wall in response to a predetermined force applied to one of said link members causing movement of said link members relative to each other and to directly transmit said force from one of said members to the other of said members, an elastomeric vibration-damping grommet means comprising spaced ribs longitudinally disposed in said opening and contacting remaining diametrically opposite portions of said pivot means and said wall to provide a yieldable interference fit between said pivot means and said link member having said opening to reduce vibration and rattle of said members and opposing recess means forming part of said opening, and each recess means receiving only one of said ribs.

4. The connection of claim 3 in which said grommet means is molded to said first link member, said grommet means having spaced side means engaging opposite sides of said first link member and each side means engaging said pivot means thereby sealing the connection between said link members formed by said pivot means and said spaced ribs which extend through said opening and which opening, and said spaced sides being connected by said form said vibration-damping means.

5. The connection of claim 4 wherein said pivot means is cylindrical and wherein said connection includes retainer means for retaining said pivot means to said first link member, and at least one of said sides of said grommet being formed with spaced ribs to accommodate tolerance variations of said retainer means.

6. In a minimum-lash, anti-rattle connection for pivotally joining and transmitting force between first and second members, said first member having an opening defined by a wall, projecting means carried by and extending from said second member into said opening and having a sliding fit therewith so as to have a surface portion in closely-spaced small-lash relationship with opposing portions of said wall and movable into direct contacting engagement with said wall for transmitting force directly between said members, and elastic grommet means carried by one of said members and having portions disposed in said opening between said projecting means located at remaining other opposing portions of said wall defining another part of said opening to provide a yieldable interference fit for said projecting means for positioning said projecting means relative to said opening to resiliently hold and bias said surface portion to a central position completely out of contact with said wall and for damping vibrations experienced by said members and permitting relative movement of said members during the transmittal of force between said members to allow said projecting means to positively engage said first mentioned opposing portion.

7. In a small-lash anti-rattle connection, first and second link members, one of said link members having an opening therein, a pivot member extending from the other of said link members through said opening and having a small lash fit with diametrically opposing portions of the walls defining a part of said opening, and elastomeric vibration-damping means disposed in said opening and contacting diametrically opposite portions of said pivot member to provide an interference fit between said pivot and said link member having said opening to reduce vibration and rattle of said members, said elastomeric vibration-damping means being a portion of an elastomeric grommet molded to said first link member, said grommet having spaced side means engaging opposite side of said first link member and each side means engaging said pivot member thereby sealing the connection between said link members formed by said pivot member and said opening, and said spaced sides being connected by yieldable intermediate members which extend through said opening and which form said vibration-damping means, said opening being elongated to provide a space for receiving said intermediate members, said minimum lash fit between said opening and said pivot member being oriented to transmit a load applied to one of said link members to the other of said link members, and said intermediate members being disposed transverse to said minimum lash fit.

References Cited

UNITED STATES PATENTS

| | | | |
|---|---|---|---|
| 2,367,832 | 1/1945 | Riesing | 287—85 |
| 3,033,624 | 5/1962 | Biesecker | 174—153 X |
| 3,079,581 | 2/1963 | Klumpp | 174—153 X |
| 3,164,054 | 1/1965 | Biesecker | 287—93 X |
| 3,193,335 | 7/1965 | Wing | 174—153 X |
| 3,236,549 | 2/1966 | Phinney | 287—93 |

DAVID J. WILLIAMOWSKY, Primary Examiner

A. V. KUNDRAT, Assistant Examiner

U.S. Cl. X.R.

248—56

PO-1050
(5/69)

UNITED STATES PATENT OFFICE
CERTIFICATE OF CORRECTION

Patent No. 3,472,541　　　　　Dated October 14, 1969

Inventor(s) Richard E. Hulten

It is certified that error appears in the above-identified patent and that said Letters Patent are hereby corrected as shown below:

In the specification, column 1, line 36, "yildably" should be -- yieldably --.

In the specification, column 1, line 38, "gommet" should be -- grommet --.

In the specification, column 2, line 55, after "lever 1" insert -- by --.

In the claims, Claim 4, column 4, line 33, delete "spaced ribs which extend through said opening and which opening, and said spaced sides being connected by said form said vibration-damping means." and insert -- opening, and said spaced sides being connected by said spaced ribs which extend through said opening and which form said vibration-damping means. --.

In the claims, Claim 7, column 5, line 3, "side", first occurence, should be -- sides --.

**SIGNED AND
SEALED
MAY 12 1970**

(SEAL)
Attest:

Edward M. Fletcher, Jr.
Attesting Officer

WILLIAM E. SCHUYLER, JR.
Commissioner of Patents